United States Patent
Hu et al.

(10) Patent No.: US 10,791,459 B1
(45) Date of Patent: Sep. 29, 2020

(54) TEST METHOD FOR VERIFICATION OF AN RSP PROCESS AND ACTIVE TEST SYSTEM PROVIDING SUCH A TEST METHOD

(71) Applicant: SIGOS GmbH, Nuremberg (DE)

(72) Inventors: Shicheng Hu, Biot (FR); Goce Talaganov, Nuremberg (DE); Vlad Bratu, Nuremberg (DE)

(73) Assignee: SIGOS GmbH, Nuremberg (DE)

( * ) Notice: Subject to any disclaimer, the term of this patent is extended or adjusted under 35 U.S.C. 154(b) by 0 days.

(21) Appl. No.: 16/584,983

(22) Filed: Sep. 27, 2019

(51) Int. Cl.
*H04W 24/06* (2009.01)
*H04W 8/24* (2009.01)
*H04W 4/70* (2018.01)

(52) U.S. Cl.
CPC ............. *H04W 8/245* (2013.01); *H04W 4/70* (2018.02); *H04W 24/06* (2013.01)

(58) Field of Classification Search
CPC .................................................... H04W 8/245
USPC ........................................................ 455/419
See application file for complete search history.

(56) References Cited

U.S. PATENT DOCUMENTS

| | | | |
|---|---|---|---|
| 7,831,249 B2 | 11/2010 | Löhlein et al. | |
| 10,097,981 B1 | 10/2018 | Talaganov et al. | |
| 10,194,313 B1* | 1/2019 | Karimli | H04W 8/205 |
| 2006/0046710 A1 | 3/2006 | Lohlein et al. | |
| 2019/0053185 A1* | 2/2019 | Shah | H04W 60/005 |

FOREIGN PATENT DOCUMENTS

WO  2004049746 A1  6/2004

* cited by examiner

*Primary Examiner* — Joel Ajayi
(74) *Attorney, Agent, or Firm* — Smartpat PLC

(57) ABSTRACT

In a test method for verification of a remote eSIM provisioning process, an eSIM profile from an RSP platform (1) under test is ordered (8). After that, a download of the ordered eSIM profile from the RSP platform (1) is triggered (9). Then, the triggered eSIM profile is downloaded (9a) from the RSP platform (1) via an over the air interface to a target eSIM or eUICC (5) in a test probe (6). It is then verified whether the ordered, triggered and downloaded eSIM profile is correct. Such a test method enhances the capabilities of a test system for testing mobile networks with remote eSIM provisioning, while the network connectivity and services are continuously provided by eSIM swapping.

11 Claims, 3 Drawing Sheets

TEST METHOD FOR VERIFICATION OF AN RSP PROCESS AND ACTIVE TEST SYSTEM PROVIDING SUCH A TEST METHOD

TECHNICAL FIELD

The invention relates to a test method for verification of a remote eSIM provisioning (RSP) process. Further, the invention relates to an active test system providing such a test method.

BACKGROUND

Test systems for mobile networks are known e.g. from U.S. Pat. No. 10,097,981 B1, from U.S. Pat. No. 7,831,249 B2 and from WO 2004/049746 A1.

SUMMARY

It is an object of the invention to enhance the capabilities of such a test system for testing mobile networks with remote eSIM provisioning.

The object is met by a test method and by an active test system as claimed.

Embedded Universal Integrated Circuit Card (eUICC) or embedded SIM (eSIM) is widespread and used for consumer IoT (Internet of Things) and M2M (Machine-to-Machine) devices, to identify a device towards a mobile network. Furthermore, eSIM is also being introduced for Smartphones. eSIM is the next generation of SIM technology, intended to replace physical cards with a combination of hardware and software offering the ability to remotely switch a device between operators. The technology allows one device to host multiple connectivity providers (known as profiles) and is designed for use across the whole spectrum of mobile devices, including smartphones and IoT modules.

The hardware part of an eUICC card is mainly manufactured in an embedded form factor (MFF2). The software part of the eSIM can be remotely downloaded and installed on to the eUICC card. The process is called Remote eSIM Provisioning (RSP). The term eUICC or eSIM mentioned in this patent is referred to a 'personalised' eUICC or eSIM as the software part of eUICC to be downloaded. An eUICC is not easily accessible or replaceable, is not intended to be removed or replaced in the device and enables a secure change of subscriptions.

GSMA has specified two standards
GSMA SGP.02 v4.0, 25 Feb. 2019—Embedded SIM Remote Provisioning Architecture
GSMA SGP.22 v2.2.1, 18 Dec. 2018—RSP Technical Specification for eSIM provisioning for the M2M devices and the consumer devices, respectively. Both aspects are covered by the test method and the active system according to the invention.

Multiple profiles may be downloaded and installed on an eUICC. A profile is associated with an operator, is a combination of a file structure, data and applications to be provisioned onto, or present on, an eUICC, which allows, when enabled, the access to a specific mobile network infrastructure. Only one profile can be activated and operational at a time. Every profile on an eUICC can be managed to be enabled, disabled, removed or switched from one to the other by an eSIM RSP platform on behalf of the operator or a third party.

The test method and the active test system apply an end-to-end test method which verifies the mobile network connectivity and services in context of the RSP process. The test method verifies RSP in the test system and to test the mobile network connectivity by using the SIM provisioned in a national or international serving network in accordance with
GSMA SGP.02 RSP for M2M devices,
GSMA SGP.22 RSP for consumer devices.

The eSIM profile is a personalized software part, i.e. a software assigned to an allocated user, of an embodied universal integrated circuit card (eUICC). Such software includes at least one user profile. The RSP process may be used for consumer devices, for example, smartphones, smartwatches, wearables, and/or for M2M (Machine to Machine) devices. The test probe may simulate an M2M device. The test probe may simulate a smartphone and/or consumer IoT device. The test method verifies in particular a mobile network connectivity and services. Ordering of the eSIM profile from the RSP platform may be done manually or automatically. A sender of the order may be a mobile network operator (MNO). Prior to the ordering, the RSP process may be initiated. During the test method, a previous working profile or a bootstrap profile initially installed on the eUICC may be disabled and the downloaded eSIM profile is enabled. The checking may be performed via monitoring of the occurrence of at least one failed criterion. Such failed criteria may be established on the basis of an RSP platform connection timeout and/or of an network attach timeout and/or based on an expected structure of an ordering, of a triggering and/or of a downloading, and/or based on a timeout of a reattach of a device with the downloaded, updated eSIM profile.

The network connectivity and services are continuously provided by eSIM swapping during the test method.

A sending entity of a subscription request may use a proxy of a mobile network operator. A subscription request may include a link or a code. During the triggering step, the sending entity of the order may confirm the subscription request from the test profile. The confirmation may trigger the test probe to find a download address for downloading the ordered eSIM profile. Triggering option may use an SM-DP+(Subscription Manager Data Preparation) default address stored at the target eSIM, may use a root SM-DS (Subscription Manager Discovery Server) for discovery of FQDN (Fully Qualified Domain Name) of the SM-DP+ address, or may use an activation code containing the SM-DP+address.

An order schedule may include a quantity of eSIM profiles to be generated by the RSP platform, may include an IMSI value or IMSI values or an IMSI range, may include an ICCID value or ICCID values or an ICCID range, may include an impersonalized profile type or impersonalized profile types or may include information about a target eSIM or about target eSIMs, such as an EID (eUICC-ID). The EID may be bound to an ordered eSIM profile id (ICCID).

A test method wherein during the triggering, the RSP platform sends a triggering SMS to the test probe addressing the target eUICC has proven its efficiency.

This applies in particular to a test method wherein the triggering SMS triggers an HTTPs session or a CAT_TP (Card Application Toolkit Transport Protocol) session. The HTTP session may establish an e2e (end to end) connection over a TLS (Transport Layer Security) protocol between the target eUICC and the RSP platform. The test probe may establish a BIP (Bearer Independent Protocol) channel for communication between the test probe and the target eUICC. The CAT_TP session may include two commands, i.e. a request for an e2e CAT_TP link and/or a data for BIP channel opening. Such HTTPs session or CAT_TP session may be maintained during the test method in particular via LTE/EPS.

In a test method wherein during triggering the test probe establishes a PDN (Packet Data Network) connection to a gateway named in the triggering SMS, a gateway identification may be performed via an APN (Access Point Name) given in particular in the triggering SMS.

The advantages of an active test system which performs the disclosed test method correspond to those mentioned above with respect to the test method. The active test system has at least one test probe including at least one target eSIM or eUICC (5) with an installed initial working profile, an interface to an RSP platform for remote provision of an eSIM profile which is different from the initial working profile, and an OTA interface for providing a communication between the RSP platform and the test probe. The test probe may be embodied as a smartphone.

An active test system wherein the RSP platform includes a Subscription Manager Data Preparation (SM-DP) module (2) and a Subscription Manager Security Routing (SM-SR) module is particularly suited for M2M application. The SM-DP (Subscription Manager Data Preparation) module may receive orders and the SM-SR (Subscription Manager Secure Routing) module may manage personalized eSIM profiles.

An order module for automatic ordering of a sequence of eSIM profiles according to an order schedule may communicate with the RSP platform via a web interface or via an application program interface (API).

An RSP platform which includes a Subscription Manager Data Preparation+(SM-DP+) module and a Subscription Manager Discovery Server (SM-DS) module is particularly suited for smartphones and/or consumer IoT devices. The SM-DP+module may manage personalized eSIM profiles. The SM-DS module may identify a suitable SM-DP+address to the test probe.

A signal connection between the SIM server with a test probe may be established via LAN/WAN. A SIM multiplexer provides a geographical separation of the test probe and the target eUICCs/eSIMs.

A cloud-based system enables a comfortable and cost-effective client connection.

BRIEF DESCRIPTION OF THE DRAWINGS

Embodiments of the invention are herein after described with reference to the accompanying drawings.

DETAILED DESCRIPTION

A. Testing eSIM RSP for M2M

Figure 1:
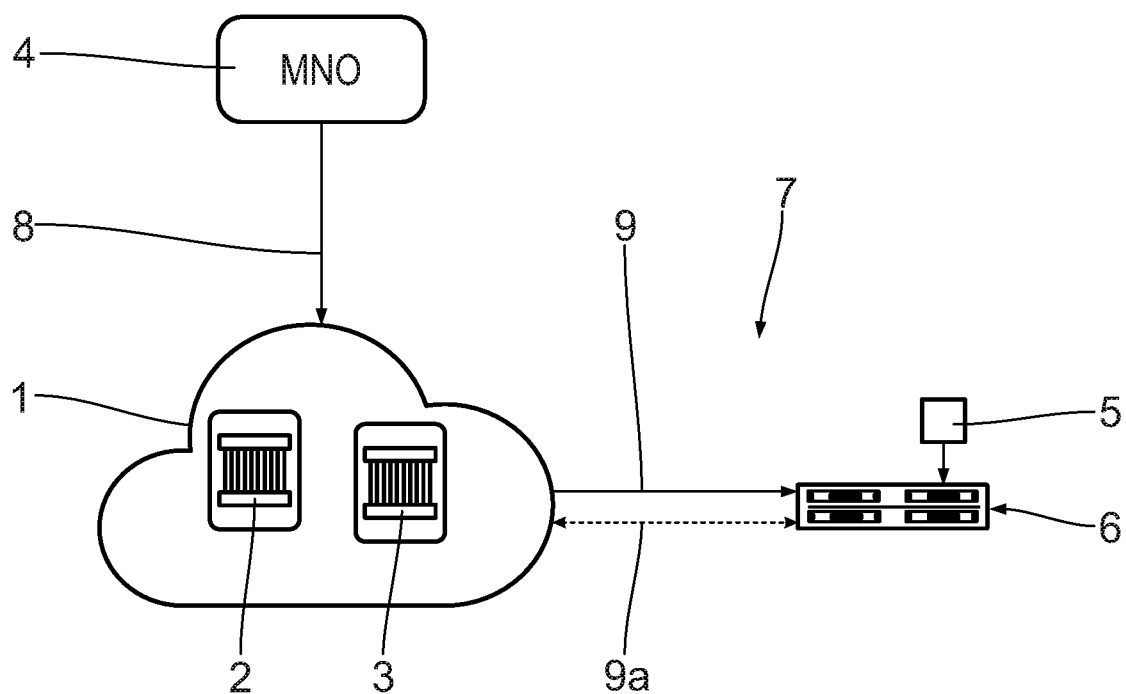
FIG. 1 shows schematically main components of an active test system for providing a test method for verification of a remote eSIM provisioning (RSP) process for an M2M (machine to machine) device.

An eUICC Remote Provisioning and Management platform or known as RSP (Remote SIM Provisioning) platform 1, is responsible for remote eSIM provisioning. It concludes two entities, an SM-DP (Subscription Manager Data Preparation) module 2 and an SM-SR (Subscription Manager Security Routing) module 3 securely connected with each other. SM-DP module 2 acts on behalf of a mobile network operator (MNO) 4. The SM-SR module 3 establishes a secure and authenticated transport channel to a personalized software part of an embedded universal integrated circuit card (eUICC) or embedded SIM (eSIM). Such software part maybe assigned to an allocated user or to a connected device, in particular as part of the internet of things (IoT). The SM-SR module 3 further manages personalized profiles at eUICC to be downloaded or switched each other.

An eSIM card 5 of any suitable form factor is inserted in a test probe 6 which according to one embodiment simulates an M2M device. The test probe 6, which can have multiple instances, is a part of an active test system 7 and configured to receive at least one required eSIM profile to be downloaded from the RSP platform 1 under test. The inserted eSIM card 5 contains a currently working profile which is different from the required profile to be ordered and provisioned.

FIG. 1 illustrates three-steps 'Order—Trigger—Download' of test procedures to verify downloading the required eSIM profile.

1. Order eSIM Profile (Order Step 8)

The RSP for an M2M device is initiated by a representative of the MNO 4 to order a particular eSIM profile for an identified target eUICC at the SM-DP module 2 of the RSP platform 1. Two exemplified test scenarios are addressed:

a) eSIM Profile Manually Ordered at the RSP Platform 1 Under Test

A human tester, on behalf of the MNO 4, will connect to the RSP platform 1 under test and send the eSIM downloading order 8 manually to the RSP platform 1 targeting to the eSIM cards in the test probe 6 and wait for a provisioning message from the RSP platform 1.

b) eSIM Profile Automatically Ordered at the RSP Platform 1 Under Test

The active testing system 7, on behalf of the MNO 4, interacts with the RSP platform 1 under test via a Web Interface or an API (Application Programming Interface) with an order token for ordering one or multiple eSIM profiles. The RSP process can be automatically initiated. The test system 7 is waiting for the provisioning message from the RSP platform 1. The order token may contain:

The quantity of the eSIM profiles to be generated by the SM-DP module 2;
IMSI value(s) or range (International Mobile Subscriber Identity);
ICCID value(s) or range (Integrated Circuit Card ID);
Un-personalized Profile type(s);
Information about the target eUICC(s), such as an EID (eUICC-ID).

2. Trigger Step 9

The SM-SR module 3 in the RSP platform 1 under test triggers a downloading of the required eSIM profile via an OTA (Over The Air) interface to the target eSIM card 5 in the test probe 6. The SM-SR module 3 sends a trigger-SMS addressing the eSIM card 5. When the test probe 6 with the current profile on the eSIM card 5 is attached to a mobile network (e.g. EPS attach at a 4G/5G network or GPRS attach at a 2G/3G network), the trigger-SMS sent by the SM-SR module 3 is delivered via the test probe 6 to the target eSIM card 5 and triggers an HTTPs session or a CAT_TP session (Card Application Toolkit Transport Protocol), depending upon eUICC support. Based on an APN (Access Point Name) encapsulated in the trigger-SMS, the test probe establishes a PDN (Packet Data Network) connection to a gateway named in the APN.

The test probe 6 receives and processes the trigger 9 to the eSIM card 5. If HTTPs is used, the trigger-SMS contains an HTTP session triggering command which results in an establishment of an e2e (end-to-end) HTTP session over TLS (Transport Layer Security) protocol between the eSIM card 5 and the SM-SR module 3 in the RSP platform 1. Beneath the HTTP session, the test probe 6 establishes a TCP/IP transport connection for the session towards the RSP platform 1 and establishes a BIP (Bearer Independent Protocol) channel for the communication between the test probe and the eSIM card 5.

If CAT_TP is used, the trigger-SMS contains two commands,
  a request for an e2e CAT_TP link to be established between the eSIM card 5 and the SM-SR module 3,
  a Data for BIP channel opening between the test probe 6 and the eSIM card 5.

Similarly, beneath the CAT_TP session, the test probe 6 establishes a UDP/IP connection for the session and establishes the BIP (Bearer Independent Protocol) channel for the communication between the test probe 6 and the eSIM card 5.

3. Download and Installation Step 9a

An operation of the required eSIM profile Download and Installation procedure is performed between the eSIM card 5 and the test probe 6 on the one hand and the RSP platform 1 under test on the other and may be carried out into four main steps.
  Creating a profile entity of a secure domain for each required eSIM profile to be downloaded on the eSIM card 5,
  Personalizing the entity with a first secure key set, called a key establishment,
  Downloading the required eSIM profile from the SM-DP module 2 and installing the eSIM profile with RAM (Remote Application Management) onto the eSIM card 5,
  Enabling the newly installed eSIM profile and disabling the previously used working profile on the eSIM card 5, called profile switching.

During the operation, the test probe 6 maintains a reliable HTTPs session or CAT_TP session over LTE/EPS (Evolved Package System).

B. Testing eSIM RSP for Consumer Devices

Figure 2:
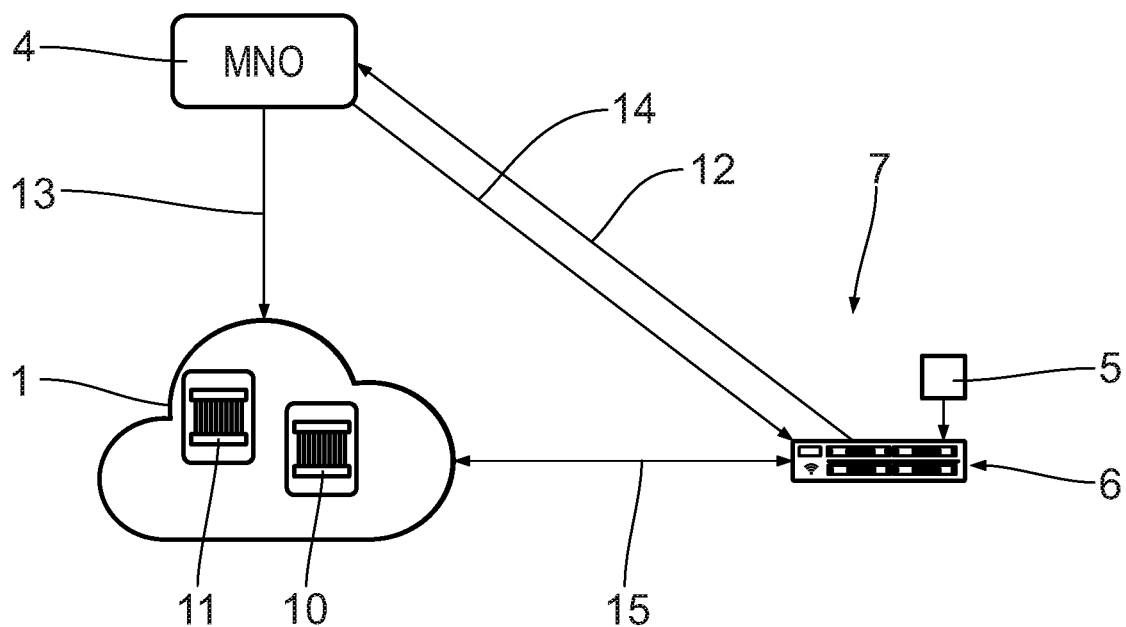
FIG. 2 shows in a schematic depiction similar to FIG. 1 a further embodiment of an active test system providing a respective RSP verification process test method for a consumer device, e.g. a smartphone or different consumer IoT devices.

With respect to FIG. 2, a further embodiment of an active test system providing a test method for verification of an RSP process for smartphones or consumer IoT devices, respectively, is described. Components and functions which already were discussed with respect to the embodiment of FIG. 1, carry the same reference numerals and not discussed in detail again.

An RSP platform 1 under test for the eSIM RSP of smartphones and/or consumer IoT devices, respectively consists of two parts: a Subscription Manager Data Preparation+ (SM-DP+) module 10 and a Subscription Manager Discovery Server (SM-DS) module 11. The SM-DP+module 10 prepares Profile Packages, secures them with a Profile Protection Key, binds each Protected Profile Package to a respective EID and securely downloads these Bound Profile Packages to the respective eSIM card 5. SM-DS module 11 is required if an SM-DP+address is unknown to the test probe 6.

The eSIM card 5 is inserted in the test probe 6 which simulates or represents a consumer device. The test probe 6 is connected to the active test system 7 and configured to receive a required eSIM profile to be downloaded from the RSP platform 1 under test. The inserted eSIM card 5 contains a currently working profile which is different from the profile(s) to be ordered and provisioned. For downloading the required eSIM profiles from SM-DP+ or discovering the SM-DP+address via the SM-DS module 11, the test probe uses HTTPs secure protocol.

FIG. 2 illustrates exemplified four-steps 'Request—Order—Trigger—Download' of test procedures to verify downloading a required eSIM profile.

1. Request 12 for Subscription

The test system 7 initiates the RSP process and requests for a subscription.

2. Order 13 eSIM Profile

The MNO 4 orders the requested eSIM profile at the SM-DP+module 10.

The prepared eSIM profile is secured stored at SM-DP+ module 10. An EID is bound to the eSIM profile id (ICCID).

3. Trigger 14—Confirmation of Subscription

The MNO 4 confirms to the test probe 6 on the subscription which triggers the test probe 6 to find a suitable address for downloading the required eSIM profile. The procedure is operator dependent and may be done by accessing a URL, by using a Local Profile Assistant (LPA) or by a native function in a device's firmware. There are e.g. three options to trigger the test probe 6 representing the consumer devices or a smartphone.
  Using a default SM-DP+address stored in the eSIM card 5
  Using root SM-DS to discover SM-DP+address (FQDN)
  Using an Activation Code (AC)

The test probe 6 selects one of the procedures in the following order.

Using a default SM-DP+address

This option is often used as power-on profile discovery. The test probe 6 retrieves the default SM-DP+address preconfigured and stored in the eSIM card 5.

Using root SM-DS for profile discovery

The test probe 6 retrieves an SM-DC address preconfigured and stored in the eSIM card 5, establishes a TLS connection with an SM-DC server, establishes a mutual authentication with SM-DC on HTTPs, and sends an Event request without Event Id. The SM-DC answers the Event request with an AC(=SM-DP+address+matching ID), i.e. an activation code. to the test probe 6.

Using AC

The active testing system 6 has received an Activation Code by any means from the MNO 4, e.g. via email or API. The AC contains at least
  an SM-DP+address
  an AC token (matching Id)

The AC can be entered in the test probe 6 by manually typing or by scanning a QR code (Quick Response).

4. Download and Installation Step 15

An operation of the eSIM Profile Download procedure 15 is performed between the test probe 6 and the SM-DP+ module 10 of the RSP Platform 1 under test. During the operation, the test probe 6 maintains a reliable e2e HTTPs session over TCP/IP via LTE/EPS or fixed cables. The test probe 6 initiates the required eSIM profile download with the parameters EID and a Matching ID to identify a bound profile package. The Matching ID is empty if the profile is downloaded from the default SM-DP+address.

After receiving the entire bound profile package, the test probe 6 initiates the installation of the required eSIM profile on the eSIM card 5 in a secure and protected way.

In a further embodiment, a smartphone may be used as the test probe 6.

The eSIM RSP in the smartphone is performed like the eSIM download procedure described above with respect to the eSIM card 5 in the test probe 6. The smartphone is considered as a specific embodiment of the test probe 6, i.e. acting as a test mobile device with the same user access interface to the mobile Applications.

In case of enterprise smartphones, an EID list is used for the required eSIM profile order. The above described approach of using root SM-DS for address discovery is applied in the Trigger step 14.

Figure 3:
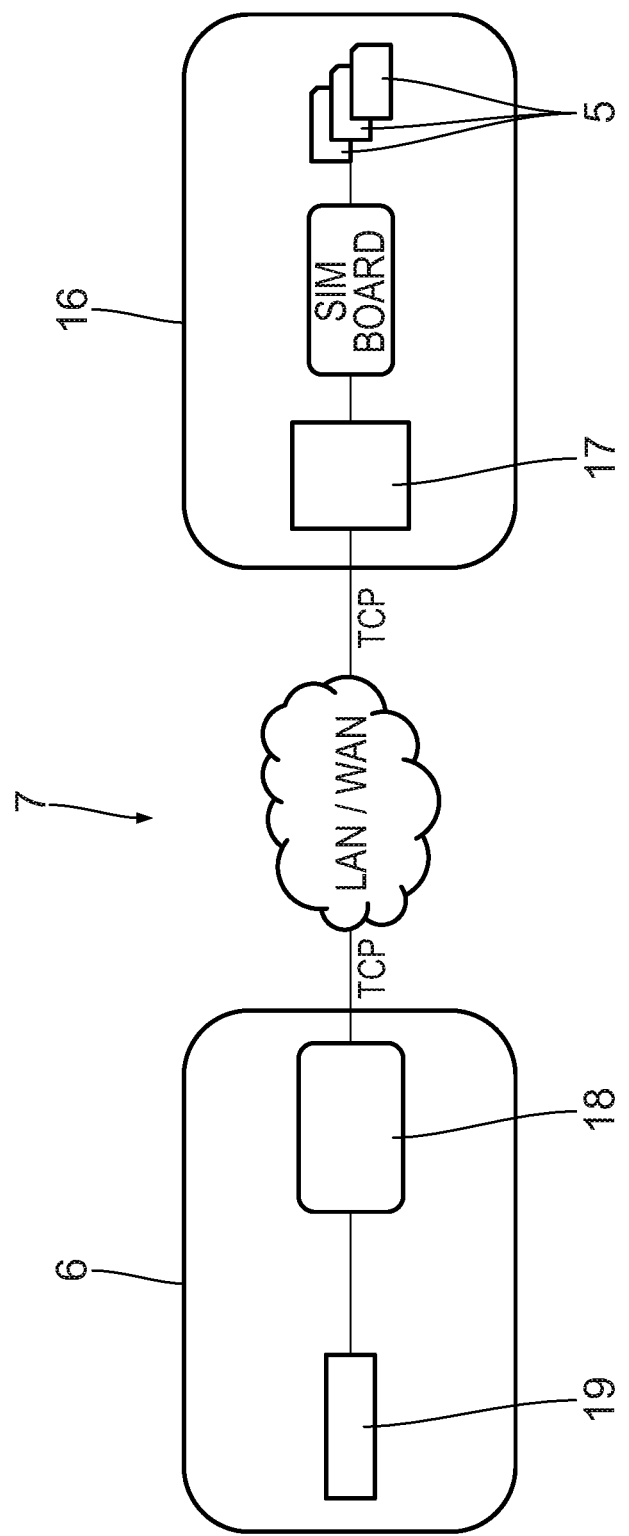
FIG. 3 shows a test system configuration including a SIM multiplexer

In a further embodiment shown in FIG. 3, the active test system includes a SIM multiplexer 16. The SIM multiplexer 16 includes a SIM server 17 and a multitude of eSIM cards 5. The SIM server 17 is in signal connection with the test probe 6 which in this embodiment includes a SIM emulation module 18 which is in signal connection with a test probe environment 19 which may be embodied as a mobile or as a smartphone.

The SIM emulation in the SIM emulation module 18 represents and behaves as a target eSIM or eUICC of eSIM card 5.

The SIM Multiplexer 16 allows a geographical separation of the test probe 6 and the eSIM cards 5 (eUICC) for the multiple eSIM provisioning and the provisioned eSIM dispatching afterwards. The test system 7, using the SIM Multiplexer 16, will bridge messages between the eSIM card 5 (eUICC) and the SM-SR module 3 (for M2M device, compare FIG. 1 above) or the SM-DP+module 10 (for smartphones and/or consumer IoT devices, compare FIG. 2 above), using the mobile connection provided by the test probe environment 19 of the test probe 6. A respective embodiment is described below with reference to FIG. 4.

The eSIM RSP verification consists of two test sequential parts.
a) Verifying that eSIM profile is provisioned and swapped from bootstrap to the target Operator by checking the test probe successfully reattaching the network and by comparing the new IMSI value with the one before eSIM RSP.
b) Post-RSP network service assurance testing by using the provisioned eSIM in the test probe for basic mobile services, e.g. HTTPs download, Ping, SMS MO MT and Voice MO MT. Such post-RSP network service assurance tests are not further described in detail.

The test system can be a traditional Server/clients model-based distributed test system. More recently, cloud-based test systems are largely deployed. The test probe may be connected to either type of the test system.

Figure 4:
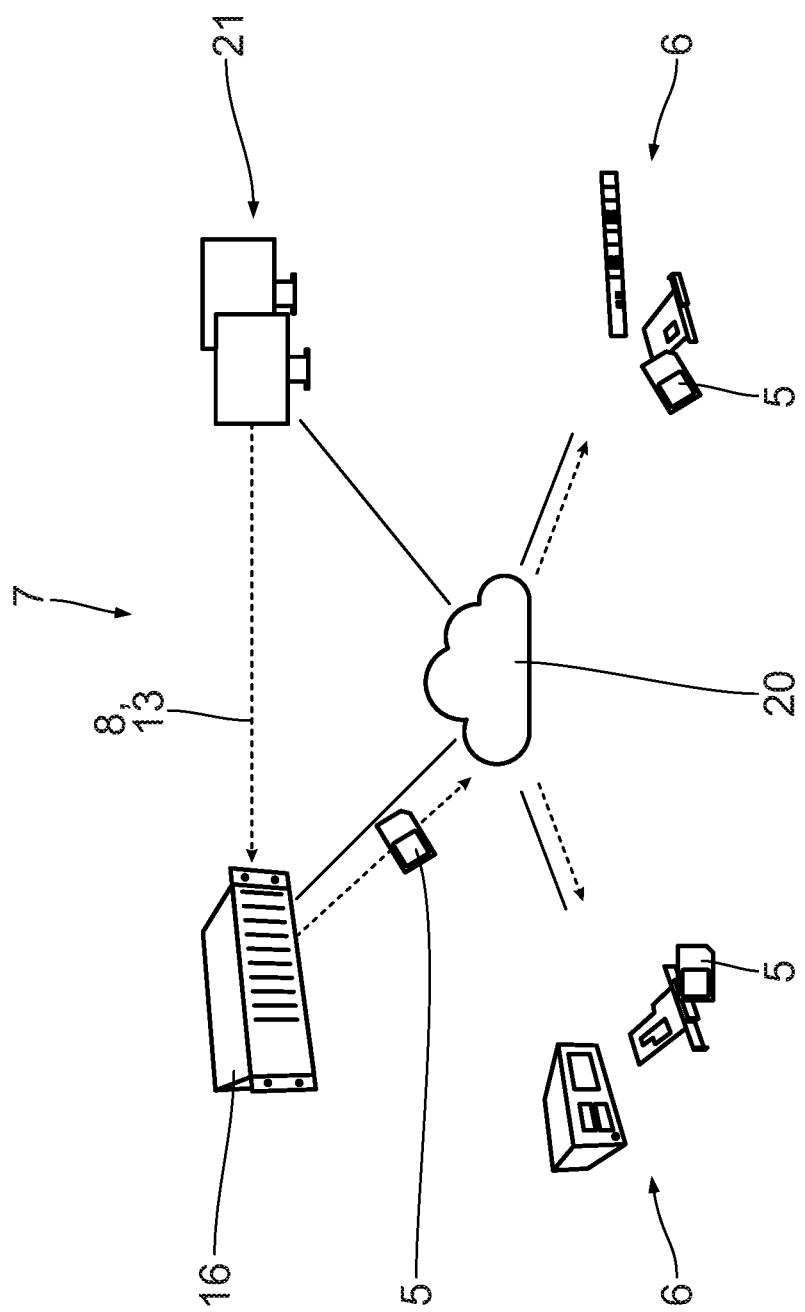
FIG. 4 shows a test system configuration communicating via a cloud.

A communication between main components of the test system 7 may be performed via a cloud-based test server 20 (cf. FIG. 4).

Such cloudified test system 7 is applied for verification of eSIM RSP process (ref. to FIG. 4), as well as supports SMS and/or RAM (Remote Application Management) over HTTP (s) via LTE/EPS.

In FIG. 4, different embodiments of test probes 6 are depicted, communicating via core network interfaces or via radio interfaces.

The RSP testing procedure using the cloudified test system 7 is the same as described above. A standard test sequence consisting of EPS ATTACH and Trigger-SMS may be performed.

In the following, main aspects regarding verification of a manually triggered RSP process are discussed.

A one-sided active test is performed. For this scenario the user starts the test and then manually triggers the RSP process from their provisioning platform (clients 21). The test sequence is:

Attach to the network (MNO 4, compare FIGS. 1 and 2 above),

Wait for receiving the provisioning SMS-MT or the SM-DP+address with an AC token, Wait until the eSIM provisioning HTTPs session between the eSIM card 5 and the RSP platform 1 (including a SM-SR module 3 or a SM-DP+10) is completed, Wait for successful network re-attach with new provisioned eSIM profile, Detach from the network.

Input Parameters

Standard test parameters should be included. In addition, a timeout parameter should be included, so that the user can set a timeout for how long to wait for the provisioning Trigger-SMS from the SM-SR module 3. Examples are given in the table below:

| Parameter | Type | Default | Description |
|---|---|---|---|
| RSP_Timeout | Integer | 90 | Timeout [s] for the detection of an IMSI change during the provisioning process. If exceeded, the module will return with err_failed. |
| Re_AttachTimeout | Integer | 90 | Timeout[s] from the network detach after the eSIM profile update until the successful re-attach to the new APN |
| SMS_DCS (Data Coding Scheme) | String | F6 | Space separated list of expected DCS values of the RSP SMS. Can be used to identify the provisioning SMS for the module results and to stop waiting for further trigger-SMS 8 bits data, Class 2 (SIM-specific) |
| Re_Attach_APN | String | | According APN for the re-attach after the eSIM profile update |

Key Parameter Indicators (KPIs)

The following KPIs should be provided:

| Name | Type | Description |
|---|---|---|
| ProvisioningSuccess | INT | If the IMSI change is detected, then this flag is 1, otherwise 0. Empty, if the module eSIM_Provisioning could not be started |
| ProvisioningDuration | DURATION_MSEC | Duration from the time of the open channel packet until the close channel packet from the decoded T0 trace |
| StartIMSI | varchar(100) | IMSI of the eSIM before the SIM profile update |
| EndIMSI | varchar(100) | IMSI of the eSIM after the successful SIM profile update |
| SMSR_IPAddress (or SM-DP+_IPAddress) | varchar(100) | IP address of the SM-SR extraced from the decoded T0 log |

-continued

| Name | Type | Description |
|---|---|---|
| SMS_ReceiveDuration | DURATION_MSEC | Duration from the start of the eSIM_Provisioning module until the incoming SMS with the expected DCS value (for M2M device) |
| SubscriptionDuration | DURATION_MSEC | Duration from the start of the eSIM_Provisioning for Subscription request until the subscription confirmation (for consumer device) |

The verification results may be recorded in a result file. Such file could be in a PCAP (Packet Capture) format.

The following fail criteria may be established during the RSP verification:
- No SMS is received from SM-SR (during the user configured timeout period) or no Subscription confirmation (AC) received
- HTTPs session is not opened between the eSIM card 5 or the SIM emulation in the SIM emulation module 18 and the RSP platform (SM-SR or SM-DP+)
- IMSI at the end is the same as the IMSI at the start
- The network re-attach to the new APN after the IMSI change is not successful In case of an automatically triggered RSP (compare the embodiment described with respect to FIG. 2 above, the active test system 7 according to FIG. 4 should use two interfaces for RSP:
- One mobile interface for RSP process itself
- One LAN interface for interacting with the API of the RSP platform 1 under test This test sequence will need to be customized depending on the platform under test that the customer is using.

The mobile interface part should have the same behavior as in the manually triggered scenario discussed above:
- Attach to the network (MNO 4, compare FIGS. 1 and 2 above)
- Wait for the provisioning trigger-SMS
- Wait until the HTTPs session between the eSIM card 5 and the RSP platform 1 (SM-SR module 3 or SM-DP+ 10) is completed,
- Detach from the network.

The LAN interface should be used to send API commands to the provisioning platform 21. The commands should be user-configurable, e.g. a download profile, a delete profile or an activate profile.

Input Parameters

Like the manual scenario, a timeout parameter should be included, so that the user can set a timeout for how long to wait for the provisioning trigger-SMS from the SM-SR module 3.

Additional parameters for interacting with the API will need to be included, such as type of operation, authentication to the API, eSIM/eUICC ID (EID)—the ID of the required eSIM profile that needs to be provisioned, IMSI. The complete list of parameters can be specified based on the particular RSP platform API documentation.

Key Parameter Indicators

The following KPIs should be provided:
- IMSI at the start of the test
- IMSI at the end of the test
- IP session duration from the PCAP file—the time duration of the IP session between the eSIM card 5 and the SM-SR module 3—this will reflect the time it took to complete the RSP operation, e.g. profile download, enabling, disabling
- IP address of SM-SR module 3 or SM-DP+module 10—from PCAP file
- IP session start duration—if possible—measured as the time duration between receiving the provisioning SMS or receiving the AC and the start of the IP session (TCP SYN from mobile to the RSP platform 1 (SM-SR or SM-DP+))
- Total provisioning duration—the time duration from sending the API 1 trigger until the IP session was completed.
- SMS receive duration—the time duration from sending the API trigger until the provisioning SMS was received
- Subscription Duration—the time duration from Subscription request until the subscription confirmation A PCAP file may be provided as result file.

The following fail criteria may be established during the RSP verification:
- No SMS is received from SM-SR (during the user configured timeout period) or no Subscription confirmation (AC) is received
- HTTPs session is not opened between the eSIM card 5 or the SIM emulation in the SIM emulation module 18 and the RSP platform (SM-SR or SM-DP+)
- IMSI at the end is the same as the IMSI at the start
- RSP platform is not reachable via API For automatic ordering of a sequence of required eSIM profiles according to an order schedule, the active test system also may include an order module which may be part of the test probe 6.

What is claimed is:

1. A test method for verification of a Remote eSIM provisioning (RSP) process including the following steps:
   ordering an eSIM profile from an RSP platform under test;
   triggering a download of the ordered eSIM profile from the RSP platform;
   downloading the triggered eSIM profile from the RSP platform via an over the air (OTA) interface to a target eSIM or eUICC in a test probe;
   checking whether the ordered and triggered eSIM profile has been downloaded correctly, wherein
   a correct download is detected by a successful reattaching of the test probe to the network and
   a failed download is detected by an occurrence of at least one failed criterion selected from the group consisting of
      an RSP platform connection timeout,
      a network attach timeout, and
      a reattach timeout with the downloaded eSIM profile; and
   recording, in a result file, at least one key parameter indicator selected from the group consisting of
      a provisioning success flag,
      a provisioning duration,
      an SMS receive duration,
      a subscription duration, and
      a network attached/reattached flag.

2. The test method according to claim 1, wherein prior to ordering, a subscription request is sent from the test probe to a sending entity of the order.

3. The test method according to claim 1, wherein the method includes an automatic ordering of a sequence of a plurality of eSIM profiles according to an order schedule.

4. The test method according to claim 1, wherein during the triggering, the RSP platform sends a triggering SMS to the test probe addressing the target eUICC.

5. The test method according to claim 4, wherein the triggering SMS triggers an HTTPs session or a CAT_TP (Card Application Toolkit Transport Protocol) session.

6. The test method according to claim 4, wherein during triggering the test probe establishes a PDN (Packet Data Network) connection to a gateway named in the triggering SMS.

7. An active test system, comprising:
 at least one test probe including at least one target eSIM or eUICC with an installed initial working profile;
 an interface to an RSP platform for remote provision of an eSIM profile which is different from the initial working profile, the RSP platform having
  a Subscription Manager Data Preparation (SM-DP) module and a Subscription Manager Security Routing (SM-SR) module or
  a Subscription Manager Data Preparation+(SM-DP+) module; and
 an OTA interface for providing a communication between the RSP platform and the test probe,
wherein
 an eSIM profile is ordered from the RSP platform,
 a download of the ordered eSIM profile from the Subscription Manager Data Preparation (SM-DP) module is triggered by the Subscription Manager Security Routing (SM-SR) module when testing a provisioning process for machine to machine devices and
 a download of the ordered eSIM profile from the Subscription Manager Data Preparation+(SM-DP+) module is initiated by the test probe when testing a process for provisioning consumer devices;
 the eSIM profile is downloaded from the RSP platform via the air (OTA) interface to the at least one target eSIM or eUICC in the test probe;
 the active test system checks whether the ordered and triggered eSIM profile has been downloaded correctly, wherein
  a correct download is detected by a successful reattaching of the test probe to the network and
  a failed download is detected by an occurrence of at least one failed criterion selected from the group consisting of
   an RSP platform connection timeout,
   a network attach timeout, and
   a reattach timeout with the downloaded eSIM profile; and
 the active test system records, in a result file, at least one key parameter indicator selected from the group consisting of
  a provisioning success flag,
  a provisioning duration,
  an SMS receive duration,
  a subscription duration, and
  a network attached/reattached flag.

8. The active test system according to claim 7, further comprising an order module for automatic ordering of a sequence of a plurality of eSIM profiles according to an order schedule.

9. The active test system according to claim 7, further comprising a SIM Multiplexer including a SIM server and a multitude of eUICCs the SIM server being in signal connection with the test probe, the at least one target eSIM or eUICC being one of the multitude of eUICCs.

10. The active test system according to claim 7, further comprising a cloud-based server.

11. The test method according to claim 1, wherein the result file is in a PCAP (Packet Capture) format.

* * * * *